United States Patent [19]

Shimizu

[11] Patent Number: 4,918,592
[45] Date of Patent: Apr. 17, 1990

[54] POWER REGULATING SYSTEM FOR PORTABLE ENGINE GENERATOR

[75] Inventor: Motohiro Shimizu, Wako, Japan

[73] Assignee: Honda Giken Kogyo Kabushiki Kaisha, Tokyo, Japan

[21] Appl. No.: 114,107

[22] Filed: Oct. 28, 1987

[30] Foreign Application Priority Data

Oct. 31, 1986 [JP] Japan .............................. 61-258568
Oct. 31, 1986 [JP] Japan .............................. 61-258569
Oct. 31, 1986 [JP] Japan .............................. 61-258570

[51] Int. Cl.⁴ .............................................. H02H 7/06
[52] U.S. Cl. ...................................... 363/50; 323/908; 322/28; 361/20; 361/21; 361/91
[58] Field of Search ............................. 363/50, 55–58; 323/908; 361/20, 21, 30, 31, 33, 56, 57, 91, 100; 322/28

[56] References Cited

U.S. PATENT DOCUMENTS

| | | | |
|---|---|---|---|
| 3,831,077 | 8/1974 | Richeson, Jr. | 363/50 X |
| 3,879,647 | 4/1975 | Hamilton et al. | 363/50 X |
| 4,453,193 | 6/1984 | Huang et al. | 363/50 X |
| 4,546,423 | 10/1985 | Seki | 363/58 X |
| 4,658,200 | 4/1987 | Kouge | 361/20 X |
| 4,751,629 | 6/1988 | Shimizu et al. | 363/37 |

Primary Examiner—Patrick R. Salce
Assistant Examiner—Emanuel Todd Voeltz
Attorney, Agent, or Firm—Gifford, Groh, Sheridan, Sprinkle and Dolgorukov

[57] ABSTRACT

There is disclosed a power regulating system for portable engine generator wherein overcurrent protection is provided by connecting the AC output of an AC generator driven by an engine to a rectifier for conversion to a DC current, supplying the DC current so obtained to an inverter to obtain an AC current of an arbitrary frequency, and providing for stopping of the driving signal to the inverter when an overcurrent state is detected in the inverter.

20 Claims, 5 Drawing Sheets

POWER REGULATING SYSTEM FOR PORTABLE ENGINE GENERATOR

BACKROUND OF THE INVENTION

1. Field of the Invention

The present invention relates to a power regulating system for portable engine generator, which comprises rectifying AC output of an AC generator, and then reconverting it into an alternating current of arbitrary frequency on an inverter to outputting.

2. Description of the Prior Art.

An example, of prior art is where a small gasoline engine and a generator are combined to obtain AC power outdoors. This is known hitherto as a portable engine generator or portable generator, which is used extensively for leisure enjoyment, field works, emergency measures and others. An AC generator such as alternator or the like is used generally as the aforementioned generator, and an engine rotational frequency (n), an output frequency (f) and a generator pole number (p) are interrelated as $n = 120\ f/p$, as is known, in this case. Then, a bipolar or quadripolar generator is used generally, and hence for obtaining an AC output stabilized at 50 Hz (or 60 Hz), the engine rotational frequency must be stabilized in a relatively low domain coming in 3,000 rpm (or 3,600 rpm) in the case, for example, of the bipolar generator. Thus, the engine is controlled for rotation by governor or other means, however, since the speed of the engine is relatively low, high operational efficiency of the engine is hard to secure and there is no alternative but make the generator larger than necessary. Still further, since an output frequency is set on the engine rotational frequency, it is difficult to keep the output frequency constant according to the engine rotational frequency, which is unsteady all the time.

Now, there is known such engine generator of an inverter power regulating system as will run an engine in a domain high in rotational frequency, convert an output of the generator into a direct current once, and then reconvert it into an alternating current of arbitrary frequency on an inverter to outputting. The inverter type engine generator has the inverter on an output stage constituted of a semiconductor switching element such as transistor or the like, and an arrangement is such that an AC output of desired voltage and frequency is obtainable from controlling the switching element on a driving signal (commutating signal) given thereto from an oscillator. Those which are disclosed, for example, in Japanese Utility Model Laid-Open No. 132,398/1984, Japanese Patent Laid-Open No. 82098/1985 and Japanese Patent Publication No. 500,557/1987 are known as representing such system.

Meanwhile, in the aforementioned engine generator of inverter power regulating system, it is preferable that a protective circuit for the inverter be provided so as to protect the inverter constituted of transistor and others from overcurrent, and thus an overcurrent state is detected normally from a direct current flowing to the inverter, and the output is stopped by fuse or NFB (no-fuse breaker) and the like whenever the overcurrent is detected. However, in case such a load as is quick in rise of the rush current like motor is connected, an overcurrent state is detected for the rush current to stop the output, and thus a restart-up operation will be necessary in each occasion, or an unoperatable state may result according to circumstances. Further, it is difficult to set a protection operating point for protection of both effective permissible rated output and instantaneous rush current, and if a set point of the overcurrent is set by the rated output for protection through detecting an overcurrent state of the inverter, then a protective operation for the inverter cannot be secured at a proper operating point when a generator rotational frequency has been changed to modify the output.

SUMMARY OF THE INVENTION

The invention has been done in view of the problems mentioned above, and its object is to provide a power regulating system for portable engine generator, which is capable of protecting an inverter from overcurrent through a proper operation therefor and operatable securely even when a large load with rush current in the range not to hinder operation of the circuit components is connected.

That is, the power regulating system for portable engine generator according to the invention is provided with a rectifier circuit for rectifying an AC output of AC generator driven by an engine, an inverter for converting the direct current obtained through rectification into an alternating current of arbitrary frequency according to a driving signal, an overcurrent detecting means for detecting an overcurrent state of the inverter, a driving signal stopping means for stopping the driving signal to the inverter for a predetermined period of time when the overcurrent state is detected. Then, the overcurrent detecting means detects an overcurrent state from the current flowing to the inverter, and thus when the overcurrent state is detected, a driving signal to the inverter is stopped for a predetermined time by the driving signal stopping means, and when the stoppage passes the predetermined time, the driving signal is fed again to the inverter.

The power regulating system for portable engine generator relating to the invention is further provided with a mean current detecting means for detecting an overcurrent state of the inverter through detecting a mean current flowing to the inverter, a rush current detecting means for detecting presence of a rush current flowing to the inverter, a driving signal stopping means for stopping a driving signal to the inverter when the situation that the overcurrent has lasted for the predetermined time is detected by the mean current detecting means or when the situation that the rush current exists for a predetermined period of time is detected by the rush current detecting means. Then, the mean current detecting means detects the overcurrent state from the mean current flowing to the inverter, and when the overcurrent state lasts for a predetermined time, the driving signal stopping means stops feeding the driving signal to the inverter to keep the state. Then, the rush current detecting means outputs a detection signal when the rush current flows to the inverter, and when the situation that the rush current exists for a predetermined time is detected, the driving signal stopping means stops feeding the driving signal to the inverter to keep the state likewise.

Furthermore, the power regulating system for portable engine generator according to the invention is provided with an overcurrent detecting means for detecting an overcurrent state of the inverter through comparing a detected value of a current carried to the inverter with a reference value, a protection circuit for protecting the inverter from the overcurrent state, and the reference value for protection of the inverter changes relatively according to the change in output of an AC generator. Then, the overcurrent detecting means detects an overcurrent state from the current flowing to the inverter, and the protection circuit protects the inverter from the current flowing in excess of a proper current carrying state corresponding to a proper output of the AC generator. In this case where an output of the AC generator changes, the reference value relatively changes according to the change as described, and a threshold level for overcurrent detection is transferred.

Figure 1:
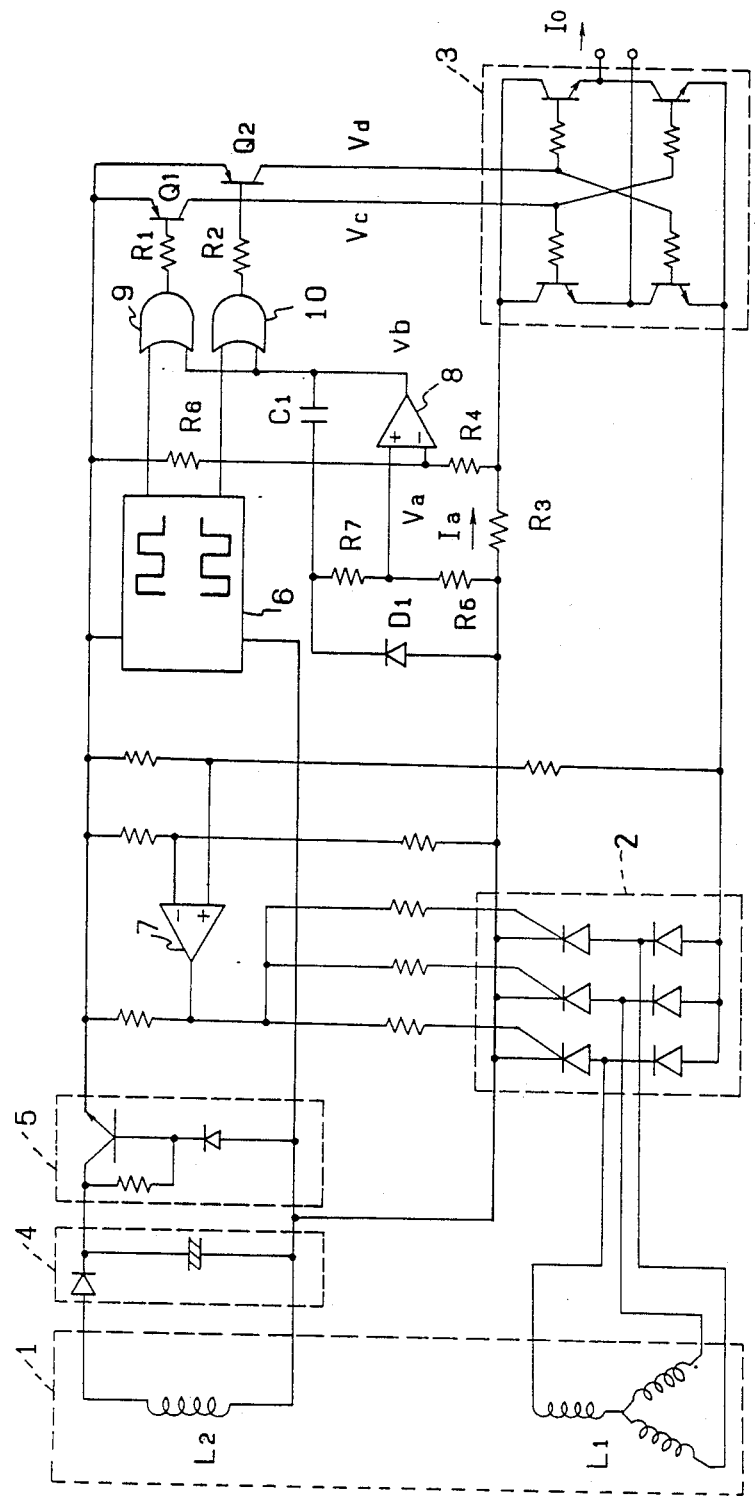
FIG. 1 is a circuit diagram representing a first embodiment of the invention.
Figure 3:
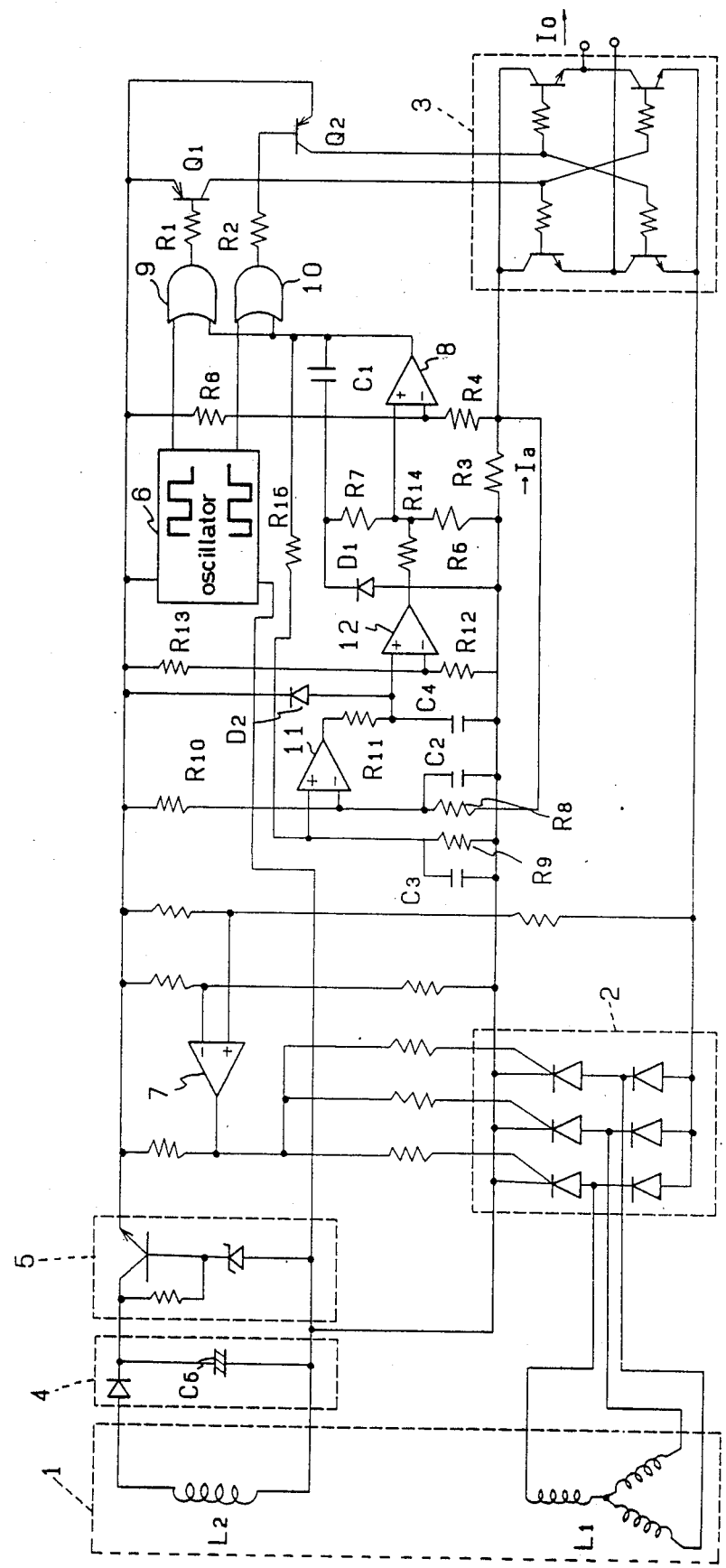
Figure 4:
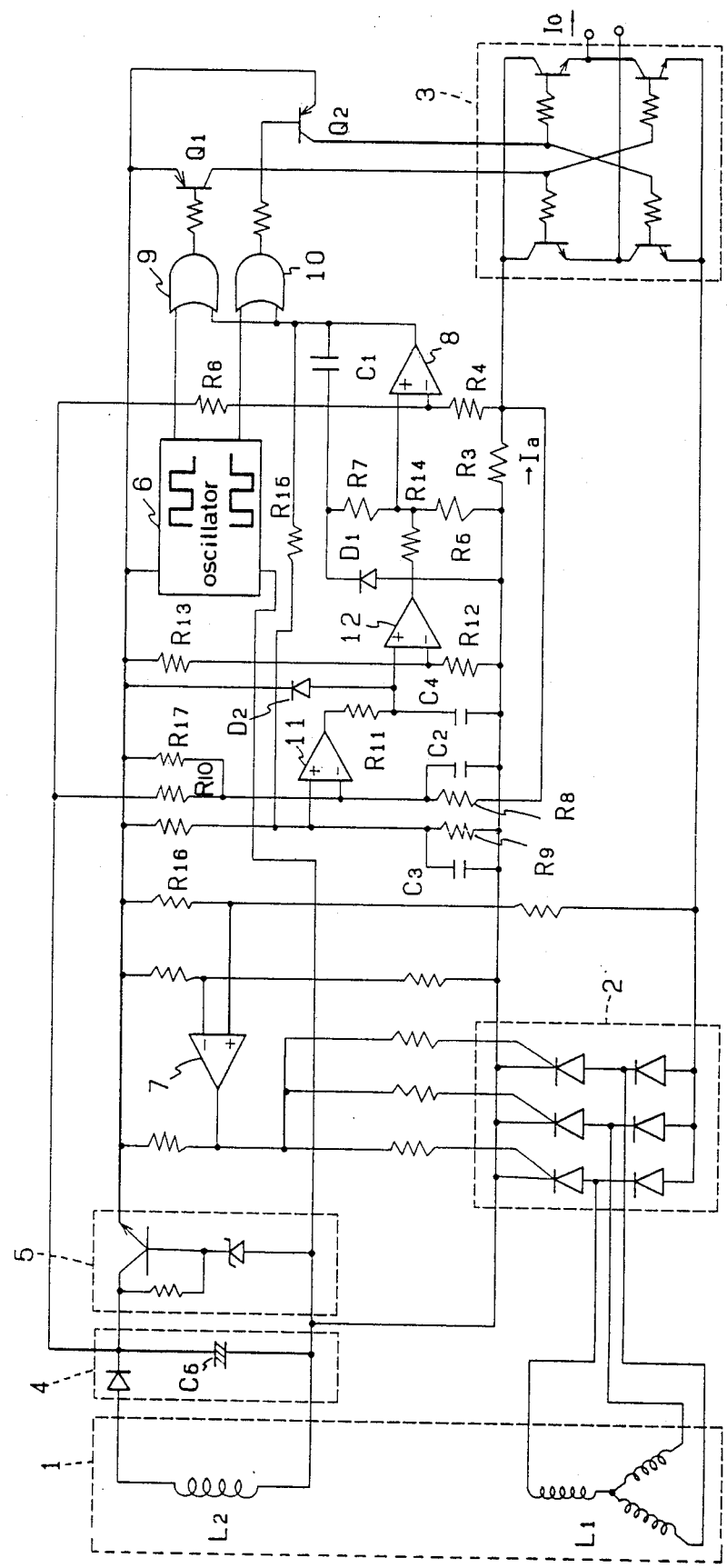

FIGS. (a)-(f) are signal waveforms diagrams of each part of FIG. 1;

FIG. 3 is a circuit diagram representing a second embodiment of the invention;

FIG. 4 is a circuit diagram representing a third embodiment of the invention;

FIG. 5 (a), (b) and

FIG. 6 (a), (b) are characteristic diagrams illustrating an operation of the circuit of FIG. 4.

DETAILED DESCRIPTION OF PREFERRED EMBODIMENTS

Preferred embodiments of the invention will now be described with reference to the accompanying drawings.

FIG. 1 is a circuit configuration drawing of an inverter type generator relating to the invention. In the drawing, 1 denotes an AC generator driven by an engine, which is provided with an output winding $L_1$ for outputting a three-phase alternating current and a controlling auxiliary winding $L_2$, the output winding $L_1$ forms a power supply for main circuit system, the three-phase AC output is subjected to a full-wave rectification by a three-phase rectifier circuit 2 consisting of a thyristor and is then given to an inverter 3 constituted of a power transistor bridge circuit. Then, the auxiliary winding $L_2$ forms a power supply for controlling system, the single-phase AC output is rectified through a rectifier circuit 4, stabilized then by a constant voltage circuit 5 and is given to an oscillator 6 for driving the inverter 3 and others. A constant voltage control circuit having a comparator 7 is provided on output side of the constant voltage circuit 5, which detects a fluctuation of the generator output voltage to control an angle of conduction of each thyristor in the three-phase rectifier circuit 2, and holds the rectifying output at a constant voltage level. Concretely, an output voltage of the three-phase rectifier circuit 2 is compared with a preset reference voltage on the comparator 7, and the angle of conduction of each thyristor is controlled so as to equalize the power voltage with the set voltage. Here, the controlling system is provided separately from the main circuit system as described, and thus no trouble may result on the controlling system even from a drop in output voltage of the generator 1.

The inverter 3 on an output stage is controlled according to driving signals from transistors $Q_1$, $Q_2$, and converts the inputted direct current into an alternating current of arbitrary frequency. In this case, the transistors $Q_1$, $Q_2$ are subjected each to a switching control according to an output pulse of the oscillator 6 feeding oscillation output alternately on an output frequency of the inverter 3, or a commercial frequency, for example, and an output of operational amplifier 8. That is, bases of the transistors $Q_1$, $Q_2$ are connected to output sides of OR gates 9, 10 through resistances $R_1$, $R_2$ respectively, and one input side of each of the OR gates 9, 10 is connected to the oscillator 6, while the other input side is connected to an output side of the operational amplifier 8. Then, a resistance (shunt) $R_3$ for current detection is interposed in a DC bus through which a DC current to the inverter 3 flows, and both ends of the resistance $R_3$ are connected to an inversional input side (−) of the operational amplifier 8 and a non-inversional input side (+) respectively through resistances $R_4$, $R_5$. Further, resistances $R_6$, $R_7$ are connected in series to the resistances $R_4$, $R_5$, and a diode $D_1$ is connected in parallel to a series circuit of the resistances $R_5$ and $R_7$.

Then, the resistance $R_3$ and the operational amplifier 8 construct an overcurrent detecting means for detecting an overcurrent state of the inverter 3 from a DC current flowing to the inverter 3, and the OR gates 9, 10 and a charging/discharging circuit of capacitor $C_1$ construct a driving signal stopping means for stopping the inverter 3 when the overcurrent state is detected and keeping the stop signal for a predetermined period of time, thereby stopping an inverter driving signal for the predetermined period of time.

Next the operation will be taken up for description. As described hereinbefore, a three-phase AC output of the AC generator 1 is converted into a direct current through the three-phase rectifier circuit 2, and is then inputted to the inverter 3. Then, it is reconverted to alternating current of predetermined frequency on the inverter 3 according to a driving signal given by way of the transistors $Q_1$, $Q_2$, and is fed to a load such as motor or the like. In this case, the transistors $Q_1$, $Q_2$ repeat ON and OFF alternately according to an output pulse of the oscillator 6, and each power transistor of the inverter 3 is subjected to switching control thereby, thus obtaining an AC output in the pattern of desired voltage and frequency. (Vc, FIG. 2(d) and Vd, FIG. 2(c)). Then, a current flowing to the inverter 3 appears as voltage on both ends of the resistance $R_3$, and when the voltage value exceeds a predetermined value, or when the current flowing to the inverter 3 exceeds a predetermined value, the situation is decided as an overcurrent, the driving signal to the inverter 3 is stopped on a signal from the operational amplifier 8, and thus the output is stopped for a predetermined period of time.

Figure 2A:
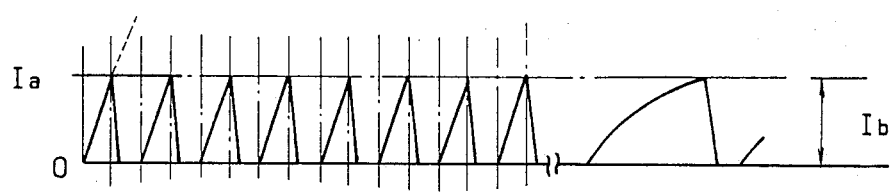
Figure 2B:
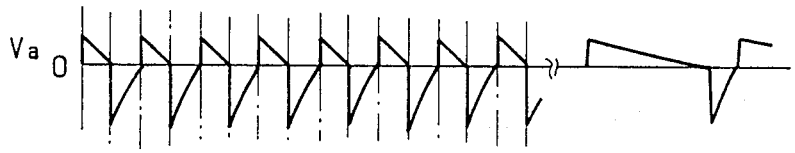
Figure 2C:
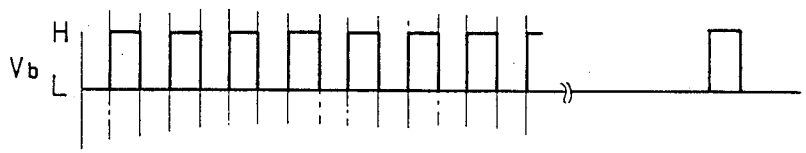
Figure 2D:
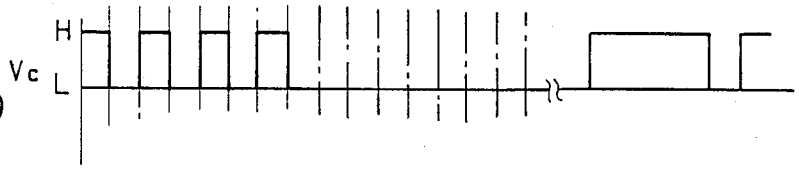
Figure 2E:
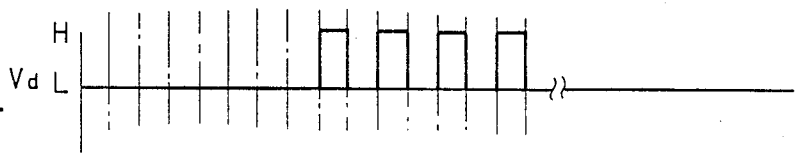
Figure 2F:
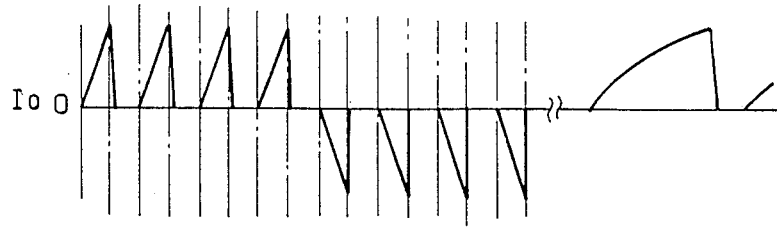

That is, a current (Ia) (see FIG. 2(a)) flowing to the resistance $R_3$ increases according as an output voltage (Io) (see FIG. 2(f)) to the load increases, and when the current (Ia) (see FIG. 2(a)) exceeds a preset permissible current value (Ib) and thus a difference (Va) (see FIG. 2(b)), in input voltage of the operational amplifier 8 becomes minus (the inversional input side of the operational amplifier 8 being higher in input voltage normally as Va>0), an output (Vb) (see FIG. 2(c)), of the operational amplifier 8 becomes H (high level). Then, when the H signal is inputted to the OR gates 9, 10, an output of the OR gates 9, 10 becomes H, the transistors $Q_1$, $Q_2$ both come to OFF and the inverter 3 stops. Whenever the inverter 3 stops and the output current (Io) becomes zero, the current (Ia) flowing to the resistance $R_3$ becomes also zero, however, since the output (Vb) of the operational amplifier 8 is applied in this case on a non-inversional input side of the operational amplifier 8 by way of the capacitor $C_1$ and the resistance $R_7$, the aforementioned differential voltage (Va) is kept as minus.

However, the capacitor $C_1$ is charged during the period, and the differential voltage (Va) is inverted to plus by the charging timer circuit after a predetermined time. In this case, the output (Vb) of the operational amplifier 8 becomes L (low level), an operation of the inverter is recommended, and the capacitor $C_1$ is discharged quickly through the diode $D_1$ and the operational amplifier 8. Then, after the operation of the inverter is recommenced, and when the current (Ia) exceeds the permissible value again, the aforementioned operation is repeated. Thus, where the output current comes to a load condition exceeding a preset current value, a signal from the oscillator 6 is kept intermitting asynchronously, thereby continuing output as protecting the output transistor of the inverter 3. FIG. 2 is a signal waveform diagram showing the above-described operation, and waveforms of current and voltage at each point in FIG. 1 are shown therein. As illustrated, if, for example, a load current is large at the time of start-up and a rush current is to flow as indicated by a dotted line, the driving signal to the inverter 3 is stopped by an output of the operational amplifier 8.

As described above, a necessary output can be secured through combining two functions, namely breaking quickly the output from detecting a peak value of the output current, which exceeds a preset value, and stopping the output then or only for a short time and returning the output thereafter, for the inverter 3 without exceeding a safe operating domain of elements of the inverter 3 on an output stage even in case the output side becomes an overload state or a short-circuit state at the time of start-up on an induction load. Accordingly, the inverter 3 can be protected securely from overcurrent and actuated also securely even from using a load with large rush current such as incandescent lamp, motor or the like as the output is never stopped completely.

Then, the aforementioned protection circuit for the inverter 3 is capable of operating as another protection circuit such as three-phase rectifier circuit 2 or the like at the same time.

FIG. 3 is a circuit diagram representing a second embodiment of the invention. The embodiment comprises detecting a presence of the peak current flowing to the inverter 3 on the operational amplifier 8, providing another operational amplifier 11 as a mean current detecting means for detecting an overcurrent state to the inverter 3, thereby stopping a driving signal to the inverter 3 when the situation that the overcurrent state lasts for a predetermined period of time is detected or when the situation that the peak current exists for a predetermined period of time is detected.

Non-inversional input side of the operational amplifier 11 is connected to the rear stage side of a resistance $R_9$ through a resistance $R_8$, and a non-inversional input side is connected to the DC bus mentioned hereinbefore through the resistance $R_9$. Further, capacitors $C_2$, $C_3$ are interposed between these input sides and the DC bus. Then, a resistance $R_{10}$ is connected in series to the resistance $R_8$, and a voltage divided by the resistances $R_8$, $R_{10}$ is inputted to the operational amplifier 11 as a reference voltage value.

Then, the series circuit of a resistance $R_{11}$ and a capacitor $C_4$ is connected to an output side of the operational amplifier 11, the node is connected to the non-inversional input side of an operational amplifier 12 and also connected to a power line through a diode $D_2$. An inversional input side of the operational amplifier 12 is connected to the DC bus mentioned hereinbefore through a resistance $R_{12}$, and a resistance $R_{13}$ is connected in series to the resistance $R_{12}$. Then, an output side of the operational amplifier 12 is connected to the non-inversional input side of the operational amplifier 8 through a resistance $R_{14}$, and further a non-inversional input side of the operational amplifier 11 is connected to an output side of the operational amplifier 8 through a resistance $R_{15}$.

A three-phase AC output of the AC generator is converted into a direct current through the three-phase rectifier circuit 2 as in the case of the above-described embodiment and is then inputted to the inverter 3. Then, it is reconverted into an alternating current of predetermined frequency on the inverter 3 according to a driving signal given through the transistors $Q_1$, $Q_2$, and is fed to a load such as incandescent lamp or the like. In this case, the transistors $Q_1$, $Q_2$ repeat ON and OFF alternately according to an output pulse of the oscillator 6, and each power transistor of the inverter 3 is subjected to switching control at the same time, thus obtaining an AC output in the pattern of desired voltage and frequency. Then, a current Ia flowing to the inverter 3 appears as a voltage drop on both ends of the resistance $R_3$, and when the voltage value exceeds a set point, or when a current flowing to the inverter 3 exceeds the set point, the situation is decided as overcurrent state, and the driving signal to the inverter 3 is stopped for a predetermined period of time by a discharging timer of the capacitor $C_1$ according to the signal from the operational amplifier 8, thus protecting the inverter 3. In this case, both the operational amplifiers 11 and 8 detect the overcurrent state of the inverter 3, but while the peak current operational amplifier 8 detects a peak value in response to a rise in the current carried to the inverter 3, the mean current operational amplifier 11 detects a mean value of the current averaged by the capacitor $C_2$. Then, the operational amplifiers 8, 11 compare each detection value (voltage value) with the reference value (voltage value divided by the resistances $R_4$, $R_6$ and the resistances $R_8$, $R_{10}$), and when the detection value has exceeded the set point, the situation is decided as overcurrent state. When the overcurrent state is detected, the inverter 3 is stopped by an output from the operational amplifier 8 in every cases as described. That is, the current Ia flowing to the resistance $R_3$ increases according as the output current Io to a load increases, and when the current value exceeds a predetermined value, outputs of the operational amplifiers 8, 11 invert, and outputs of the OR gates 9, 10 change to turn the transistors $Q_1$, $Q_2$ off. In this case, however, since the capacitor $C_1$ and the diode $D_1$ are connected to the output side of the operational amplifier 8, the inverter operation is recommenced after a predetermined time (charging time of the capacitor $C_1$) even if the peak current becomes an overcurrent to stop the output. Thus, even such load as is large in rush current is ready for start-up securely. Further, since the resistance $R_{11}$ and the capacitor $C_4$ are connected to an output side of the operational amplifier 11, the inverter is never stopped operating if the mean current becomes an overcurrent, thus the inverter is kept going for the period of time decided by a time constant of the resistance $R_{11}$ and the capacitor $C_5$, and is stopped after the lapse of a charging timer time by the capacitor $C_4$. Further, in case the peak current becomes an overcurrent and the inverter is stopped operating only for the period of time predetermined on an output of the operational amplifier 8, an output signal of the operational amplifier 8 is inputted to a non-inversional input terminal of the operational amplifier 11 through the resistance $R_{15}$ and is stored in the capacitor $C_3$. Accordingly, where a charge storage of the capacitor $C_3$ according to the output signal from the operational amplifier 8 which indicates a presence of the peak current increases the operational amplifier 11 is operated despite an overcurrent state of the mean current, and the inverter is stopped operating not to return automatically as in the case of the mean current being an overcurrent state. For return the generator 1 must be stopped by shutting down the engine once. Since the diode $D_2$ is provided, a charge of the capacitor $C_4$ is discharged through the diode $D_2$ when the generator 1 is stopped.

Next, an operation of the inverter 3 for detecting an overcurrent state from the current carried thereto will be described in detail. In the embodiment, both mean current and peak current of the current carried to the inverter 3 are detected by the operational amplifiers 11, 8, and an overcurrent is detected for each of them.

Referring first to a detection of the mean current, the output current Io corresponds to the current Ia flowing to the resistance $R_3$, and appears as a voltage Va across the resistance $R_3$ ($Va = |R_3| \times Ia$) ($|R_3|$ being ohmic value of the resistance $R_3$: likewise hereinafter). The voltage Va is applied to a detection input side (−) of the operational amplifier 11 through the resistance $R_8$ having a satisfactorily high ohmic value, however, the voltage value is that of being smoothed by the capacitor $C_2$, namely a mean value. In this case, a voltage $$Vcc \times \frac{|R_8|}{|R_8| + R_{10}|}$$

($|R_8| < |R_{10}|$), Vcc being a power line voltage, is already applied to an inversional input side of the operational amplifier 11, and the non-inversional input side is 0V when an output of the operational amplifier 8 is L (low level). Accordingly, an output of the operational amplifier 11 becomes H from L at the point in time when Io increases on the output power to the above mean value being $$\overline{|R_3| \times Ia}$$

$$\overline{|R_3| \times Ia} \geq Vcc \times \frac{|R_8|}{|R_8| + R_{10}|},$$

or it exceeds a set current, the capacitor $C_4$ is gradually charged through the resistance $R_{11}$, and a terminal voltage $Vc_4$ rises from 0V. Then, when the terminal voltage $Vc_4$ gets higher than the voltage value divided by the resistances $R_{12}$, $$R_{13} \left( Vc_4 \geq Vcc \times \frac{|R_{12}|}{|R_{12}| + |R_{13}|} \right),$$

an output of the operational amplifier 12 becomes H from L, and a voltage $Vcc \times$ $$\frac{|R_5|}{|R_5| + |R_{14}|}$$

is given to a non-inversional input side of the operational amplifier 8. From setting as $$\frac{|R_5|}{|R_5| + |R_{14}|} > \frac{|R_6|}{|R_4| + |R_6|}$$

in this case, an output of the operational amplifier 8 is kept at H while the output of the operational amplifier 12 is H. When the output of the operational amplifier 8 becomes H, outputs of the OR gates 9, 10 become both H, and the inverter 3 comes to stop. Then, the output of the operational amplifier 8 is applied on a non-inversional input side of the operational amplifier 11 as a voltage $Vcc \times$ $$\frac{|R_9|}{|R_9| + |R_{15}|}$$

through the resistance $R_{15}$, however, from setting as $$\frac{|R_9|}{|R_9| + |R_{15}|} > \frac{|R_8|}{|R_8| + |R_{10}|}$$

in this case, an output of the operational amplifier 11 becomes H, and thus the inverter 3 is kept shut down by the loop. The inverter 3 is not stopped immediately when the current Ia flowing to the resistance $R_3$ becomes an overcurrent but stopped after the time decided by a time constant of the resistance $R_{11}$ and the capacitor $C_4$ passes. Then, when the inverter 3 is once stopped, it does not return automatically, and hence a protective operation similar to the function of NFB is carried out.

Referring now further to a detection of the peak current, the terminal voltage Va of the resistance $R_3$ is applied on an inversional input side of the operational amplifier 8 through the resistance $R_4$. When the output current Io is 0, a voltage $Vcc \times$ $$\frac{|R_4|}{|R_4| + |R_6|}$$

is applied on the inversional input side of the operational amplifier 8, and the non-inversional input side is 0V when an output of the operational amplifier 12 is L. Accordingly, when the output current Io increases to $|R_3| \times Ia \geq Vcc \times$ $$\frac{|R_4|}{|R_4| + |R_6|}$$

(provided, $|R_6| > |R_4| > R_3|$), the output of the operational amplifier 8 becomes H from L, and the inverter 3 immediately comes to stop. In this case, however, there is a time lag for the output of the operational amplifier 8 to return to L from H through a positive return circuit covering the capacitor $C_1$ and the resistances $R_7$, $R_5$, and thus even if the inverter 3 stops to Ia=0, the output is not recommenced immediately. Further, after the output of the inverter 3 is recommenced, when the output current Io increases to exceed the specified value again, the output is stopped, and the aforementioned operation is repeated. Then, the output of the operational amplifier 8 on H charges the capacitor $C_3$ through the resistance $R_{15}$ in the form of being divided by the resistance $R_9$. Thus, a voltage on a non-inversional input side of the operational amplifier 11 is raised, and from setting as $$\frac{|R_9|}{|R_9| + |R_{15}|} \times d > \frac{|R_8|}{|R_8| + |R_{10}|}$$

(d being a duty ratio of output of the operational amplifier 8 on H), an output of the operational amplifier 11 becomes H even in the case of load conditions wherein a peak value of the carried current exceeds the set point, and thus a function as NFB operates as in the case of the aforementioned operation when the mean current exceeds the set point.

As described above, the inverter 3 has two functions, namely detecting a peak value of the output current and breaking the output quickly when it exceeds a set point, stopping the output then or for a short time only and returning the output thereafter combined for detecting the peak current, and hence a necessary output can be secured without exceeding a stable operation domain of switching elements of the inverter 3 on an output stage even in case the output side gets in an overcurrent state or a shortcircuit state. Accordingly, the inverter 3 can be protected securely from overcurrent, and the output is never stopped completely, therefore operation can be secured even in case a load large in rush current such as incandescent lamp, motor or the like is used.

FIG. 4 is a circuit diagram representing a third embodiment of the invention. The embodiment comprises using the operational amplifiers 8 and 11 as an overcurrent detecting means, actuating a protection circuit of the inverter through comparing the output value (detection value) with a reference value, and in this case the reference value is changed relatively according to a change in output of the AC generator 1.

Figure 5A:
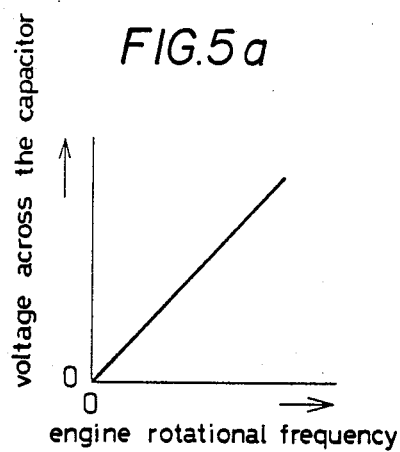
Figure 5B:
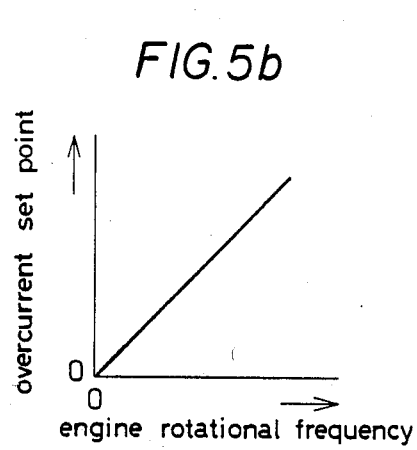

That is, the resistances $R_6$, $R_{10}$ for level shift bias to detection input sides of the operational amplifiers 8, 11 receive a voltage supply directly from the capacitor $C_4$ not through the constant voltage circuit 5. A voltage across the capacitor $C_4$ is the voltage having rectified an output of the auxiliary winding $L_2$ of the AC generator 1 as shown in FIG. 5(a), which is proportional to the engine rotational frequency (generator output). Thus, the overcurrent set point (reference value) compared on the operational amplifiers 8, 11 changes relatively according to a change in output of the AC generator 1, and in case, for example, a comparison reference voltage of the operational amplifiers 8, 11 is made zero, the overcurrent set point is proportional to the engine rotational frequency as shown in FIG. 5(b). Thus, a detection level of the overcurrent automatically changes correspondingly to a change in output of the AC generator 1, therefore the inverter 3 can securely be protected.

Further, in the embodiment, a resistance $R_{16}$ is connected in series between the resistance $R_9$ and the power line, and the node is connected to a non-inversional input side of the operational amplifier 11. Then, a resistance $R_{17}$ is connected in series between the resistance $R_8$ and the power line, and the node is connected to an inversional input side of the operational amplifier 11.

Figure 6A:
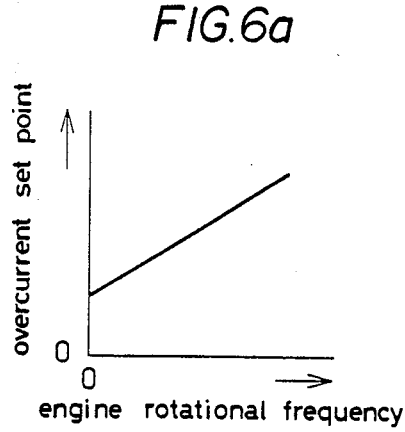
Figure 6B:
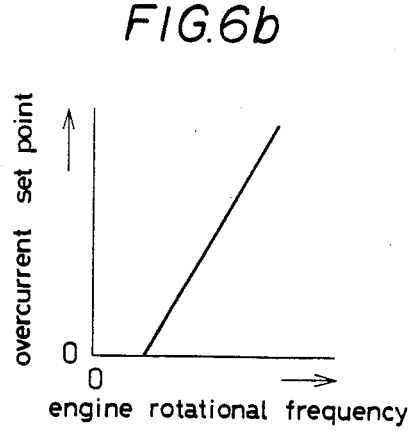

Thus, a proportional relation between the overcurrent set point and the engine rotational frequency can be changed as shown in FIG. 6 by connecting either the resistance $R_{16}$ or the resistance $R_{17}$. That is, from adding a level shift on a fixed voltage to a detection input side (non-inversional input side) of the operational amplifier 11 from the resistance $R_{17}$ separately from the resistance $R_{16}$, the overcurrent set point to the engine rotational frequency becomes less as shown in FIG. 6(a). Further, if the comparison reference voltage of the operational amplifier 11 is raised through the resistance $R_{16}$, a change in the overcurrent set point to the engine rotational frequency becomes less as shown in FIG. 6(b).

Thus, in case the output is transferred by changing a rotational frequency of the AC generator 1, a set level of the overcurrent for protection of the inverter through a bias compensation of the transistor (saturated to use) and also for protection of the generator itself (output being not taken excessively) is also transferred, therefore a protecting function of the overcurrent is changed in line with a desired output, and thus the generator 1 and the inverter 3 can be protected securely. Further, an external switch and others for transferring the overcurrent set level are not required, thus providing the system moderate in cost and high in reliability. Then, that for the three-phase rectifier circuit 2 and others can be used at the same time for the protection circuit of the inverter 3 as in the case of the embodiment described hereinbefore, further one piece of protector is quite enough to entail no adjustment, and as described above, a protection of the inverter through bias compensation of the transistor and a protection of the generator itself can be effected concurrently.

What is claimed is:

1. In a power regulating system for a portable generator provided with an engine, an AC generator driven by the engine, a rectifier circuit for rectifying an AC output of the AC generator, an inverter for reconverting a direct current obtained through rectification into an alternating current of arbitrary frequency according to a driving signal, the improvement comprising an over current detecting means for detecting an over current state of said inverter and a driving signal stopping means, wherein the driving signal to said inverter is stopped for a predetermined period of time only when the over current state is detected, and then is recommenced after said predetermined period of time, and if the over current state is detected again, the driving signal to said inverter is stopped again for a predetermined period of time and then recommenced after said predetermined period of time and repeating such operation until such time that the over current state is not detected.

2. The power regulating system for portable engine generator as defined in claim 1, wherein the AC generator has an output winding and an auxiliary winding, the output winding forms a power supply of a main circuit system for outputting an AC power of predetermined frequency through the inverter, the auxiliary winding forms a power supply of a control system for generating a driving signal of the inverter.

3. The power regulating system for portable engine generator as defined in claim 1 or 2, the inverter comprising transistor bridge circuits switched and driven alternately on the driving signal of predetermined frequency.

4. The power regulating system for a portable engine driven generator, as defined in any of claims 1 or 2, wherein said overcurrent detecting means comprises a current detecting resistance disposed in a main circuit system, a comparator for comparing the potential difference across said current detecting resistance a charging/discharging circuit including a capacitor, connected between the output of said comparator and its input, said overcurrent detection means thereby producing an overcurrent detection signal continuously for a predetermined period of time after an overcurrent state is cleared.

5. The power regulating system for portable engine generator as defined in claim 4, wherein the driving signal stopping means comprises OR gates to which outputs of an oscillator and the comparator are inputted, the outputs of the OR gates being connected to power transistors.

6. In a power regulating system for portable engine generator provided with an engine, an AC generator driven by the engine, a rectifier circuit for rectifying an AC output of the AC generator, an inverter for reconverting a direct current obtained through rectification into an alternating current of arbitrary frequency according to a driving signal, the improvement comprising a mean current detecting means for detecting a mean current flowing to said inverter to detection of an overcurrent state of the inverter, a peak current detecting means for detecting a presence of a peak current flowing to said inverter, a driving signal stopping means for stopping a driving signal to said inverter continuously when the situation that an overcurrent state is kept standing for a predetermined period of time is detected by said mean current detecting means or when the situation that a peak current is present for a predetermined period of time is detected by said peak current detecting means.

7. The power regulating system for portable engine generator as defined in claim 6, wherein the AC generator has an output winding and an auxiliary winding, the output winding forms a power supply of a main circuit system for outputting an AC power of predetermined frequency through the inverter, the auxiliary winding forms a power supply of a controlling system for generating a driving signal of the inverter.

8. The power regulating system for portable engine generator as defined in claim 6 or 7, wherein the inverter comprises transistor bridge circuits switched and driven alternately on the driving signal of predetermined frequency.

9. The power regulating system for a portable engine generator as defined in any of claims 6 or 7, wherein the peak current detecting means comprises a current detecting resistance disposed in the main circuit system, a comparator for comparing the voltage drop across said current detecting resistance with a reference value, a charging/discharging circuit including a capacitor, connected between the output and the input of said comparator, said peak current detecting means thereby continuously producing a signal for a predetermined period of time only after an overcurrent state is cleared.

10. The power regulating system for portable engine generator as defined in any of claims 6 or 7, wherein the mean current detecting means comprises a current detecting resistance disposed in the main circuit system, a comparator for comparing the voltage drop with a reference value, an output of the comparator is fed back to an input side of said comparator through a charging timer circuit, thereby obtaining an overcurrent detection signal continuously.

11. The power regulating system for a portable engine generator as defined in claim 9, wherein an output signal of said comparator for detecting peak current is inputted to an input side of said comparator for detecting mean current, an output signal generated from said comparator for detecting mean current is inputted to an input side of said comparator for detecting peak current, thereby continuing the output of the comparator for detecting peak current until the output of the said comparator for detecting a mean current detects an overcurrent condition, and thereupon stopping the driving signal to the inverter.

12. The power regulating system for a portable engine generator as defined in claim 9, the driving signal stopping means comprising OR gates to which an output of oscillator for generating the driving signal to the inverter and an output of the comparator for detecting peak current are inputted, the output of said OR gates each being connected to a power transistor.

13. In a power regulating system for a portable generator provided with an engine, an AC generator driven by the engine, a rectifier circuit for rectifying an AC output of the AC generator, an inverter for reconverting a direct current obtained through rectification into an alternating current of arbitrary frequency according to a driving signal, the improvement characterized in that in an over current detecting means for detecting an over current state of the inverter by comparing a detection value of the current carried to said inverter with a reference value and repeatedly starting and stopping the driving signal each time the over current condition is detected, until such time as the over current condition is no longer detected, whereby a protection circuit for protecting the inverter from the over current state is provided, and said reference value is changed relatively according to a change in output of said AC generator.

14. The power regulating system for portable engine generator as defined in claim 13, wherein the AC generator has an output winding and an auxiliary winding, the output winding forms a power supply of a main circuit system for outputting an AC power of predetermined frequency through the inverter, the auxiliary winding forms a power supply of a controlling system for generating a driving signal of the inverter.

15. The power regulating system for portable engine generator as defined in claim 13 or 14, the inverter comprising transistor bridge circuits switched and driven alternately on the driving signal of predetermined frequency.

16. The power regulating system for portable engine generator as defined in any of claims 13 or 14, the overcurrent detecting means and the protection circuit comprising a mean current detecting means for detecting a mean current flowing to the inverter to detection of an overcurrent state of the inverter, a peak current detecting means for detecting the presence of a peak current flowing to said inverter, a driving signal stopping means for stopping a driving signal to said inverter when the situation that the overcurrent state is kept standing for a predetermined period of time is detected by said mean current detecting means or when the situation that the peak current is present for a predetermined period of time is detected by said peak current detecting means.

17. The power regulating system for a portable engine generator as defined in any of claims 13 or 14, wherein the peak current detecting means for detecting an overcurrent state due to the peak current carried to the inverter comprises a current detecting resistance disposed in the main circuit system, a comparator for comparing the voltage drop across said current detecting resistance with a reference value, a charging/discharging circuit including a capacitor connected between the output of said comparator and the input of said comparator, said overcurrent detection means thereby producing an overcurrent detection signal for a predetermined period of time after an overcurrent state is cleared.

18. The power regulating system for portable engine generator as defined in any of claims 13 or 14, wherein the mean current detecting means for detecting an overcurrent state due to the mean current carried to the inverter comprises a current detecting resistance disposed in the main circuit system, a comparator for comparing the voltage drop with a reference value, an output of the comparator is fed back to an input side of said comparator through a charging timer circuit, thereby obtaining an overcurrent detection signal continuously.

19. The power regulating system for portable engine generator as defined in any of claims 13 or 14, wherein an output signal of the comparator for detecting peak current is inputted to an input side of the comparator for detecting mean current, an output signal generated from the comparator for detecting mean current is inputted to an input side of the comparator for detecting peak current, the output of the comparator for detecting peak current being continued to stopping the driving signal to the inverter continuously.

20. The power regulating system for a portable engine generator as defined in any of claims 13 or 14, wherein a change in output of the auxiliary winding is detected as a DC signal, said detected signal being inputted to an input side of said comparator.

* * * * *